United States Patent [19]

Liese et al.

[11] Patent Number: 5,074,612
[45] Date of Patent: Dec. 24, 1991

[54] SPOILER ARRANGEMENT ON THE REAR OF A MOTOR VEHICLE

[75] Inventors: Hartmut Liese, Moensheim; Jens Quittenbaum, Weissach-Flacht; Wolfgang Moebius, Schwieberdingen, all of Fed. Rep. of Germany

[73] Assignee: Dr. Ing. h.c.F. Porsche AG, Fed. Rep. of Germany

[21] Appl. No.: 615,294

[22] Filed: Nov. 19, 1990

[30] Foreign Application Priority Data

Nov. 23, 1989 [DE] Fed. Rep. of Germany ....... 3938737

[51] Int. Cl.$^5$ .............................................. B62D 35/00
[52] U.S. Cl. .................... 296/180.5; 296/106; 296/146
[58] Field of Search ............... 296/180.1, 180.5, 76, 296/106, 146

[56] References Cited

U.S. PATENT DOCUMENTS

| | | | |
|---|---|---|---|
| 2,877,046 | 3/1959 | Funk | 296/180.5 |
| 2,932,370 | 4/1960 | Kraus et al. | 296/180.5 X |
| 4,174,863 | 11/1979 | Gotz | 296/180.5 |
| 4,413,854 | 11/1983 | Hirshberg | 296/76 X |
| 4,773,692 | 9/1988 | Scheicher et al. | 296/180.5 |
| 4,887,681 | 12/1989 | Durm et al. | 296/180.5 X |
| 4,889,382 | 12/1989 | Burst et al. | 296/180.5 |

FOREIGN PATENT DOCUMENTS

| | | |
|---|---|---|
| 0226778 | 7/1987 | European Pat. Off. |
| 3003565 | 8/1981 | Fed. Rep. of Germany ... 296/180.5 |
| 3511809 | 10/1986 | Fed. Rep. of Germany . |
| 2564791 | 11/1985 | France ............................ 296/106 |
| 47616 | 2/1989 | Japan ............................. 296/106 |

Primary Examiner—Margaret A. Focarino
Assistant Examiner—Gary C. Hoge
Attorney, Agent, or Firm—Evenson, Wands, Edwards, Lenahan & McKeown

[57] ABSTRACT

A spoiler arrangement is arranged in the rear area of a fast back of a motor vehicle and, in the operative position, extends essentially above a rear window. So that the free design of the vehicle body is not impaired significantly and an effective protection of the spoiler arrangement is ensured when driving through an automatic car wash installation, the adjustably constructed spoiler arrangement is formed by a partial area of the rear window, the partial area in the retracted inoperative position, extending flush with the skin with respect to the adjacent rear window section.

11 Claims, 3 Drawing Sheets

SPOILER ARRANGEMENT ON THE REAR OF A MOTOR VEHICLE

BACKGROUND AND SUMMARY OF THE INVENTION

The invention relates to a spoiler arrangement on the rear of a motor vehicle, particularly a passenger car, which is arranged in the rear area of a fast back and extends essentially above a rear window.

From the German Pat. Document No. DE-OS 35 11 809, a spoiler arrangement of the initially mentioned type is known which is installed fixedly on the rear and functions well. This spoiler arrangement has the purpose of, on the one hand, reducing the drag coefficient of the vehicle and, on the other hand, increasing the negative lift at the rear axle.

So that this spoiler arrangement will not be damaged when driving through a certain type of automatic car wash installations, an expensive swivel mechanism is provided for the spoiler arrangement. In addition, the stationary spoiler arrangement impairs the free — also stylistic — design of the body in the area of the spoiler arrangement.

The EP-A 0 226 778 shows a spoiler arrangement arranged at a notchback of a motor vehicle which can be moved from a retracted inoperative position to an extended operative position and vice versa. In the inoperative position, the spoiler arrangement is arranged inside a recess-shaped receiving space of the rear opening hood.

This arrangement has the disadvantage that the recess-shaped receiving space arranged on the bottom side of the hood projects relatively far into the trunk, thereby considerably reducing the capacity of the trunk.

It is an object of the invention to take such measures on a spoiler arrangement arranged adjacent to a rear window of a fast back that the spoiler arrangement, when driving through an automatic car wash installation, is effectively protected from damages without any significant impairment of the free design of the vehicle body, and in that, in addition, the capacity of the trunk provided below the fast back is reduced only slightly.

According to the invention, this object is achieved providing an arrangement wherein an adjustably constructed spoiler arrangement, in a retracted inoperative position, forms a partial area of the rear window, the partial area extending flush with the shell, with respect to the adjacent rear window section.

The principal advantages achieved by means of the invention are that, by means of the adjustable design of the spoiler arrangement and by means of the integration of the spoiler arrangement into the rear window, the free design of the vehicle body in the area of the spoiler arrangement is not impaired and it is also ensured that the retracted spoiler arrangement is not damaged when driving through a car wash installation. By using a thin-walled disk section as a spoiler arrangement, it is achieved that the spoiler arrangement has only a low height and can correspondingly, in the inoperative position, be received in a shallow receiving space, whereby the capacity of the trunk space is limited only insignificantly.

Other objects, advantages and novel features of the present invention will become apparent from the following detailed description of the invention when considered in conjunction with the accompanying drawings

DETAILED DESCRIPTION OF THE DRAWINGS

Figure 1:
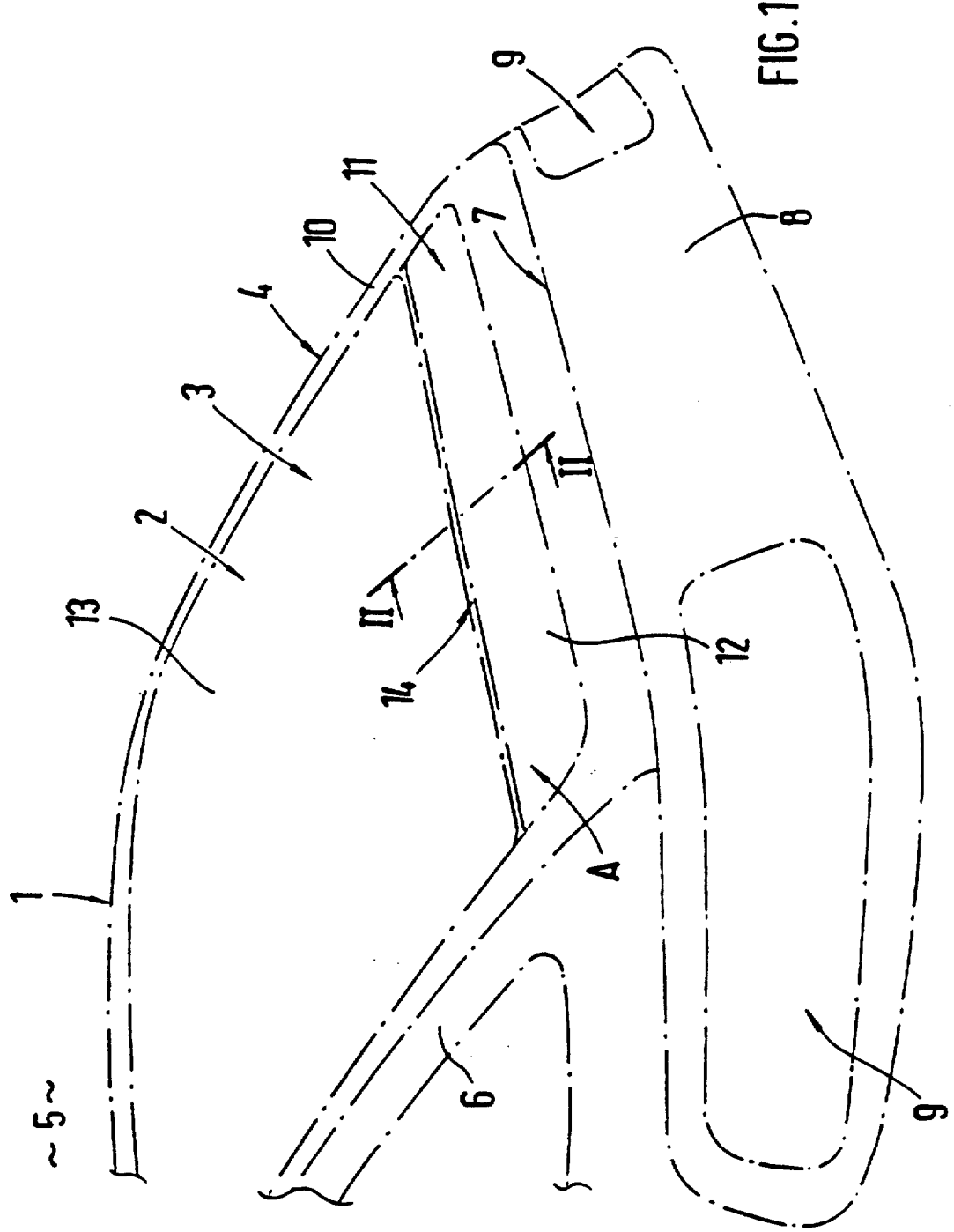
FIG. 1 is a diagonal view from the rear of the rear area of a passenger car having a spoiler arrangement, constructed according to a preferred embodiment of the invention.

In the shown area, a passenger car 1 has a fast back 2 which is essentially formed by a hatchback 4 provided with a rear window 3.

By means of hinges, the hatchback 4 is pivoted on a roof 5 and, at the two longitudinal sides, extends to the lateral parts 6 of the vehicle body. The rear lower edge 7 of the hatchback 4 extends to an upright rear closing wall 8 at which light units 9 are provided.

On the side of the circumference, the rear window 3 is surrounded by a bordering frame 10 which is constructed in the manner of a hollow support. However, the possibility also exists of constructing the rear window 3 without any frame. A spoiler arrangement 11 is also provided on the rear side which is constructed to be adjustable and can be moved from a retracted inoperative position A into an extended operative position B and vice versa.

According to FIG. 1, the spoiler arrangement 11, in the retracted inoperative position A, forms a partial area 12 of the rear window 3, the partial area 12 extending flush with the shell with respect to the adjacent rear window section 13 (common window plane D—D).

In the embodiment, the partial area 12 extends adjacent to the rear lower edge 7 of the hatchback 4 or of the bordering frame 10. The partial area 12 which, in comparison to the rear window section 13, has a relatively small area, in the inoperative position A is adapted to the course of the shape of the adjacent large-surface rear window section 13 in the longitudinal direction as well as in the transverse direction of the vehicle, so that visually a unit is formed of the rear window 3 and the spoiler arrangement 11. A narrow transversely extending seam 14 extends between the rear window section 13 and the spoiler arrangement 11.

The spoiler arrangement 11 has a thin-walled window section 15 made of glass, plastic (plexiglass) or the like, the window section 15 being designed to be transparent or provided with a printing or a tinting.

For receiving the spoiler arrangement 11 in the retracted inoperative position A, a boat-shaped part 16 is provided which extends at a relatively close distance — low height — to the exterior spoiler arrangement 11. Part 16, at the upper transversely extending edge area, is fixedly connected (for example, by means of gluing) with the adjacent stationary rear window section 13. In addition, the boat-shaped part 16, in the remaining circumferential area, extends to the bordering frame 10 of the hatchback 4 and is fastened to it.

By means of the boat-shaped part 16, it is prevented that water enters into the trunk 17 disposed underneath it when the spoiler arrangement (operative position B) is swiveled upward. For the moving of the spoiler arrangement 11 from the inoperative position A into the operative position B and vice versa, an adjusting device 18 is provided which, on the one hand, is applied to the boat-shaped part 16 and, on the other hand, to the interior side 19 of the spoiler arrangement 11.

An end area to the spoiler arrangement 11 facing the upper rear window section 13 is hinged to the boat-shaped part 16 by way of at least one hinge 20. In this case, a short vertical hinge arm 21 is fastened to a flange 22 of part 16 extending in the same direction, whereas an approximately L-shaped hinge arm 23, with its free end, rests against the interior side 19 of the spoiler arrangement 11 and is held in position there by means of gluing.

According to a first embodiment, the adjusting mechanism 18 comprises a lifting device 24 having a motor which is arranged at the hatchback 4, is not shown in detail and by way of a connecting member 25 (Bowden cable with a spiral or flexible shaft) drives a gear wheel 26 of a gear unit 27. The lifting device 24 is arranged away from the hinge 20 and specifically behind it.

Figure 2:
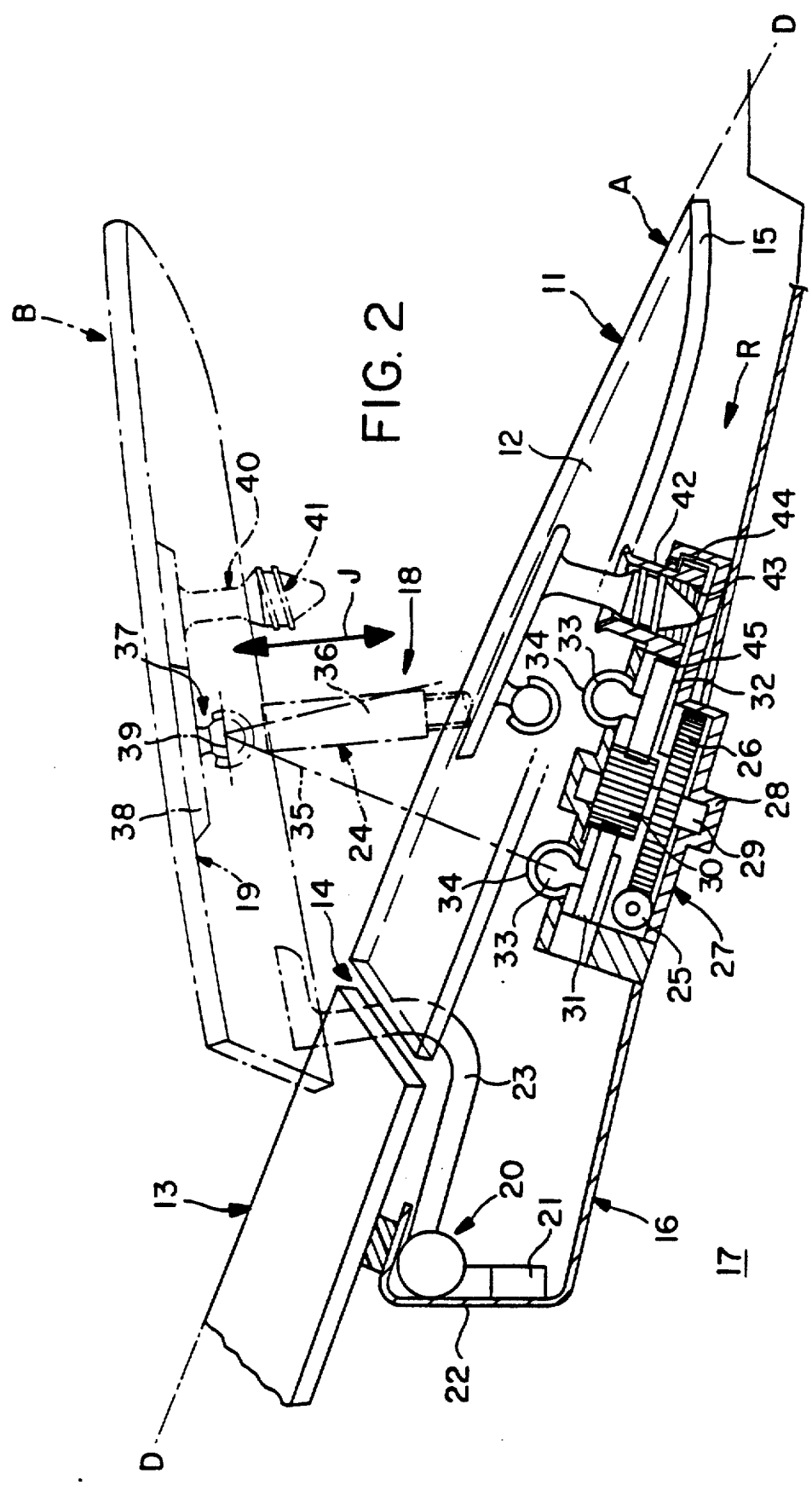
FIG. 2 is a sectional view taken along Line II—II of FIG. 1.

The gear unit 27 has a housing 28 which, on the bottom side, is fastened to part 16. In addition, the housing 28 comprises an upright shaft 29 which carries the gear wheel 26 and a pinion 30 disposed above it and with the same axis. The pinion 30 interacts with two toothed racks 31, 32 which extend on both sides of the pinion 30. Depending on the rotating direction of the pinion 30, the two toothed racks 31, 32 are moved in the transverse direction C of the vehicle. Spherical heads 33 are fastened to the free ends of both toothed racks 31, 32 respectively and interact with corresponding ball sockets 34 of rod-shaped elements 35, 36. The other end of the elements 35, 36 is connected to the spoiler arrangement 11 in a hinged manner by way of spherical-head connections 37, a plate 38 with two spherical heads 39 being glued to the interior side 19 of the spoiler arrangement 11. The rod-shaped elements 35, 36 are adjustable in the longitudinal direction, as indicated by arrow J in FIG. 2.

Figure 3:
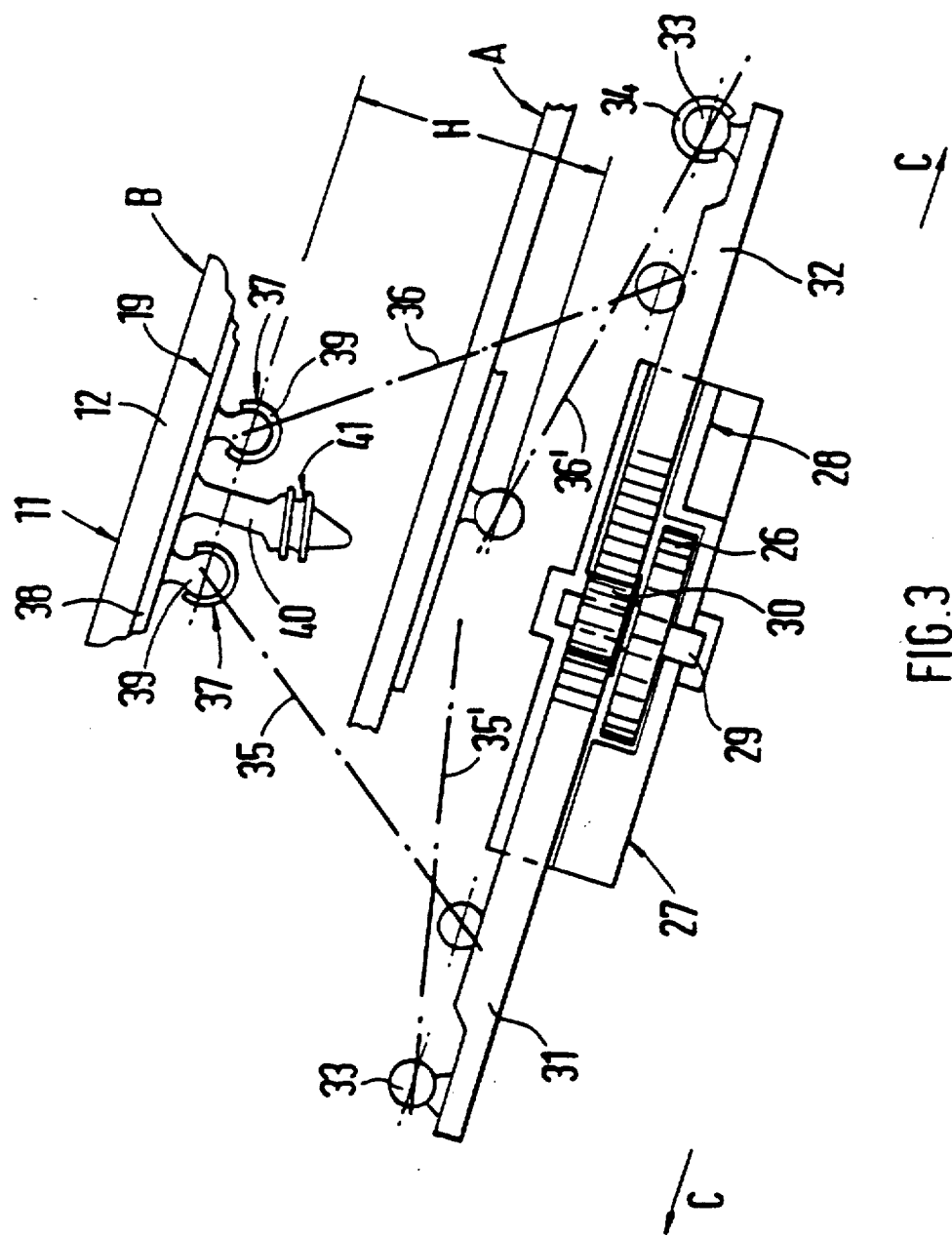
FIG. 3 is an exploded schematic view in the direction of the arrow R of FIG. 2 showing the adjusting device.

For the tilting-out of the spoiler arrangement 11, the two toothed racks 31, 32 are moved toward the inside in the direction of the pinion 30, whereby the elements 35, 36 are caused to move upward and tilt out the spoiler arrangement 11. If the tilted-out spoiler arrangement 11 is to be moved into its inoperative position A, the toothed racks 31, 32 are moved toward the outside (C) by the pinion 30, causing the spoiler arrangement to carry out a stroke movement H in the downward direction. In this case, elements 35, 36 take up position 35', 36' (FIG. 3).

In addition a downward-projecting journal 40 having an end-side conical stopping slope and molded-on threads 41 is provided at the plate 38, this journal 40 interacting with a rotatable bush 42 of the gear case 28. The rotatable bush 42 has an internal thread 43 and an external toothing 44, the external toothing 44 being in an operative connection with a corresponding toothing 45 of one of the two toothed racks (such as 32).

By means of the interaction of the rotatable bush 42 and the journals 40 of the spoiler arrangement 11, even an iced-up spoiler arrangement 11 is moved upward into the operating position B.

The adjusting arrangement 18 may, for example, also be arranged as a four-hinge arrangement or the like (not shown in detail).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A spoiler arrangement on the rear of a motor vehicle, which is arranged in the rear area of a fast back, the motor vehicle having a rear window that has first and second sections, the second section of the rear window forming the spoiler arrangement, the second section being adjustable to an operative position extending essentially above the first section, and a retracted inoperative position in which the second section extends flush with the first section.

2. A spoiler arrangement according to claim 1, wherein the spoiler arrangement forms a rear end area of the rear window.

3. A spoiler arrangement according to claim 1, wherein, a boat-shaped part is provided below the retracted spoiler arrangement for receiving the spoiler arrangement.

4. A spoiler arrangement according to claim 2, wherein, a boat-shaped part is provided below the retracted spoiler arrangement for receiving the spoiler arrangement.

5. A spoiler arrangement according to claim 3, wherein the boat-shaped part is fixedly connected with at least one of the first section and an edge-side bordering frame of the rear window.

6. A spoiler arrangement according to claim 5, wherein the second section is formed by a thin-walled window section.

7. A spoiler arrangement according to claim 6, wherein the window section is made of at least one of glass, or plastic.

8. A spoiler arrangement according to claim 7, wherein an adjusting arrangement is provided for the moving of the spoiler arrangement, said adjusting arrangement being applied on the one side to a boat-shaped part and, on the other side, to the spoiler arrangement.

9. A spoiler arrangement according to claim 8, wherein an end area of the spoiler arrangement facing the first section is pivotally connected by way of at least one hinge with the boat-shaped part, and wherein — viewed in the longitudinal direction — away from the hinge, a lifting device is provided for the tilting-out and moving-in of the spoiler arrangement.

10. A spoiler arrangement according to claim 9, wherein the lifting device comprises a gear wheel arranged on the boat shaped part side and driven by a connecting member, this gear wheel driving a pinion arranged above it with the same axis, the pinion interacting with two toothed racks, and the free ends of the two toothed racks, by way of rod-shaped elements, being in operative connection with the spoiler arrangement.

11. A spoiler arrangement according to claim 10, wherein the rod-shaped elements are adjustable in the longitudinal direction and, by way of spherical-head connections, are connected with the toothed racks and the spoiler arrangement.

* * * * *